United States Patent
Crosby et al.

(10) Patent No.: US 9,260,006 B2
(45) Date of Patent: Feb. 16, 2016

(54) JAW-TYPE POSITIVE LOCKING BRAKE

(71) Applicant: Parker-Hannifin Corporation, Cleveland, OH (US)

(72) Inventors: Mike Crosby, Jonesborough, TN (US); Jason Emmette, Greeneville, TN (US); David Heathcoat, Greeneville, TN (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 300 days.

(21) Appl. No.: 14/052,273

(22) Filed: Oct. 11, 2013

(65) Prior Publication Data

US 2014/0102066 A1    Apr. 17, 2014

Related U.S. Application Data

(60) Provisional application No. 61/712,604, filed on Oct. 11, 2012.

(51) Int. Cl.
| | | |
|---|---|---|
| *B60K 7/00* | (2006.01) | |
| *A01D 34/64* | (2006.01) | |
| *A01D 69/10* | (2006.01) | |
| *B60T 1/00* | (2006.01) | |
| *B60T 13/04* | (2006.01) | |
| *F16D 63/00* | (2006.01) | |
| *F16D 121/14* | (2012.01) | |

(52) U.S. Cl.
CPC .............. *B60K 7/0015* (2013.01); *A01D 34/64* (2013.01); *A01D 69/10* (2013.01); *B60T 1/005* (2013.01); *B60T 13/04* (2013.01); *F16D 63/006* (2013.01); *F16D 2121/14* (2013.01)

(58) Field of Classification Search
CPC ..................... B60K 7/0015; B60K 2007/0046; F16D 31/02; F16D 2125/22; F16D 2125/32; F16D 65/15; F16D 65/60; A01D 34/64
See application file for complete search history.

(56) References Cited

U.S. PATENT DOCUMENTS

| | | | | |
|---|---|---|---|---|
| 3,032,146 | A * | 5/1962 | Cortelli | F16D 49/16 116/208 |
| 3,361,231 | A | 1/1968 | Carroll | |
| 3,856,119 | A * | 12/1974 | Harrington | B60T 1/005 188/69 |
| 4,161,240 | A * | 7/1979 | Pringle | F16D 65/60 188/196 BA |
| 4,376,614 | A | 3/1983 | Woodruff | |
| 5,740,891 | A * | 4/1998 | Song | B60T 1/005 188/250 B |
| 6,983,829 | B2 | 1/2006 | Drennen et al. | |
| 7,762,116 | B2 | 7/2010 | Mc Vey et al. | |
| 2008/0034958 | A1* | 2/2008 | Korthals | F16D 31/02 92/12.2 |
| 2008/0120974 | A1* | 5/2008 | Dong | B60K 7/0015 60/464 |
| 2012/0019050 | A1 | 1/2012 | Feusse | |

FOREIGN PATENT DOCUMENTS

GB    1317801    7/1970

* cited by examiner

*Primary Examiner* — Christopher Schwartz
(74) *Attorney, Agent, or Firm* — Renner, Otto, Boisselle & Sklar, LLP

(57) ABSTRACT

Provided is a hydrostatic transmission including a hub having a plurality of radially outwardly protruding teeth circumferentially spaced around the hub and at least one jaw having at least one tooth for engaging teeth on the hub to prevent rotation of the hub, thereby preventing rotation of an output shaft of a motor. When the at least one tooth on the jaw engages teeth on the hub, rotation of the output shaft is prevented by interference rather than friction.

20 Claims, 11 Drawing Sheets

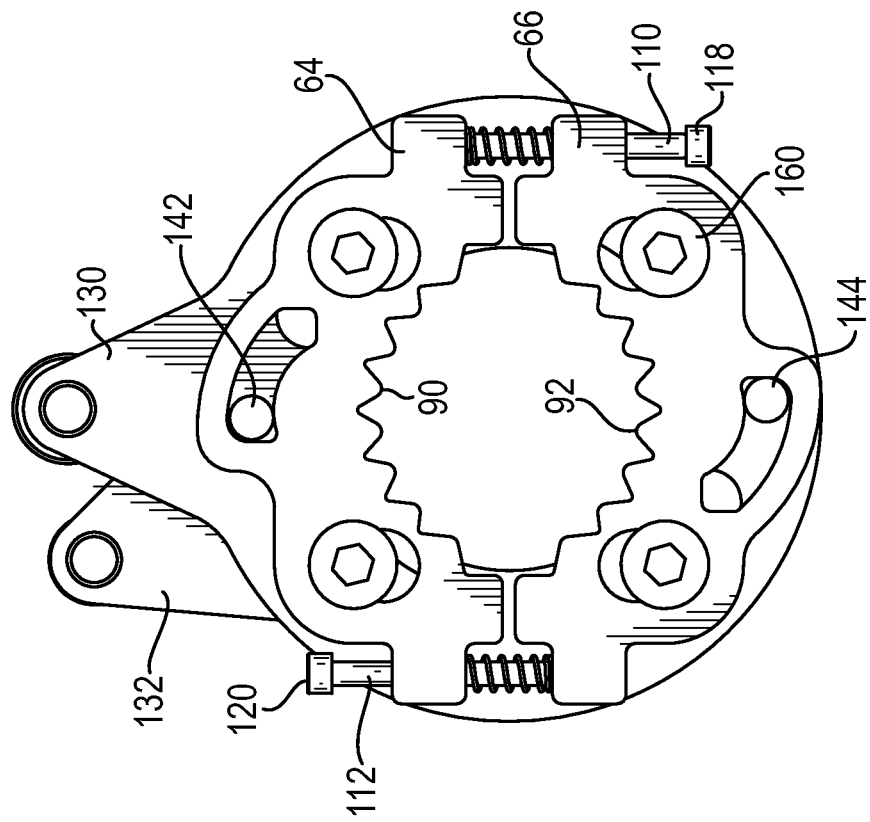
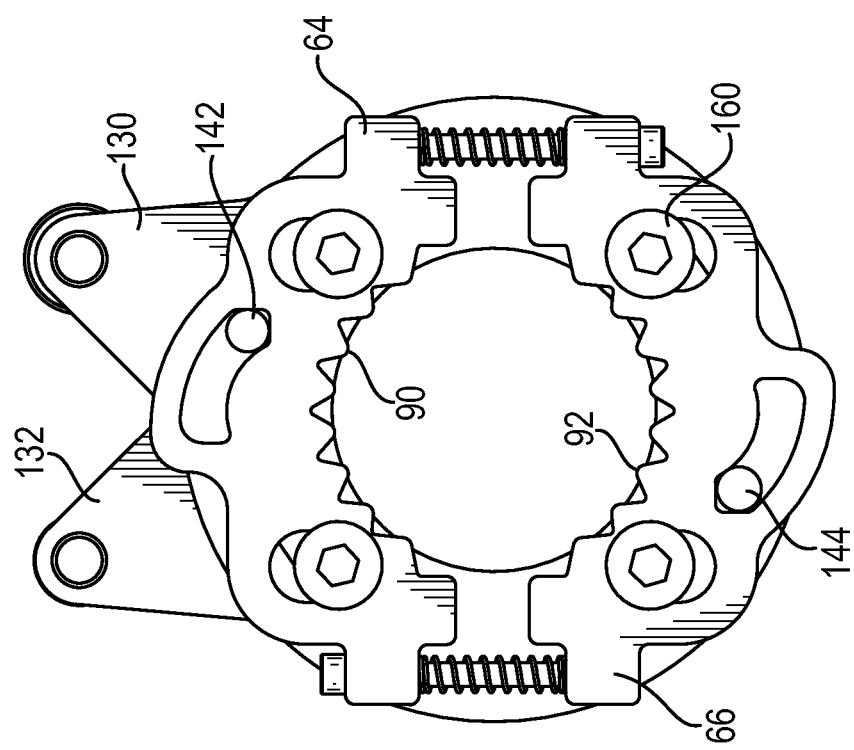

JAW-TYPE POSITIVE LOCKING BRAKE

RELATED APPLICATIONS

This application claims the benefit of U.S. Provisional Application No. 61/712,604 filed Oct. 11, 2012, which is hereby incorporated herein by reference.

FIELD OF INVENTION

The present invention relates generally to transmissions, and more particularly to brake assemblies for transmissions for use in vehicles, such as mowing machines.

BACKGROUND

Hydrostatic transmissions have many uses, including the propelling of vehicles, such as mowing machines. A typical hydrostatic transmission system includes a variable displacement hydraulic pump connected in a closed hydraulic circuit with a fixed or variable displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is often connected through suitable gearing to the vehicle's wheels or tracks.

In some vehicles, such as zero-turn-radius mowers, separate hydraulic pumps and motors are used to independently drive separate wheels of an axle. By independently driving the wheels in opposite directions, for example, the vehicle can be made to turn with zero radius. Zero-turn-radius mowers are increasingly popular as the size and costs of such mowers decrease. As the size of such mowers decreases, however, the space available for the hydraulic components and/or the prime mover also decreases.

SUMMARY OF INVENTION

The present invention provides a hydrostatic transmission including a hub having a plurality of radially outwardly protruding teeth circumferentially spaced around the hub and at least one jaw having at least one tooth for engaging teeth on the hub to prevent rotation of the hub, thereby preventing rotation of an output shaft of a motor. When the at least one tooth on the jaw engages teeth on the hub, rotation of the output shaft of the motor is prevented by interference rather than friction.

According to one aspect of the invention, a hydrostatic transmission is provided that includes a hydraulic pump, a hydraulic motor being in fluidic communication with the hydraulic pump and including an output shaft, a hub for mounting a wheel, the hub including a hole for receiving the output shaft of the motor, a hub portion, and a flange portion extending radially outwardly from an outer axial end of the hub portion, the hub portion having axially inwardly from the flange portion, a plurality of radially outwardly protruding teeth circumferentially spaced around the hub portion, and at least one jaw having at least one tooth and at least one cam slot in which a cam is received for moving the at least one jaw between first and second positions, wherein the at least one jaw is movable between the first position where the at least one tooth is disengaged from teeth on the hub portion and the second position where the at least one tooth engages teeth on the hub portion to prevent rotation of the hub.

In an embodiment, the transmission further includes a rotation plate having the cam, the cam being movable in the at least one cam slot and engageable with radially inner and outer sides of the cam slot for moving the at least one jaw between the first and second positions.

In another embodiment, the transmission further includes a stationary plate defining a bearing area for the rotation plate.

In yet another embodiment, the rotation plate and the stationary plate each include an opening through which the output shaft extends.

In still another embodiment, the transmission further includes at least one mounting bolt coupled to the motor to mount the at least one jaw, the rotation plate, and the stationary plate to the motor, the at least one mounting bolt guiding movement of the rotation plate and at least one jaw.

In a further embodiment, the at least one mounting bolt has a plurality of stepped surfaces, wherein one of the plurality of stepped surfaces axially retains the at least one jaw, one of the plurality of stepped surfaces axially retains the rotation plate, and one of the plurality of stepped surfaces axially retains the stationary plate.

In another embodiment, the at least one stepped surface that axially retains the stationary plate engages an opening in the stationary plate to prevent movement of the stationary plate.

In yet another embodiment, the at least one jaw includes a plurality of radially inwardly protruding teeth for engaging teeth on the hub portion.

In still another embodiment, the at least one jaw includes at least two jaws each having at least one radially inwardly projecting tooth, wherein the at least two jaws are movable relative to one another between the first and second positions.

In a further embodiment, the transmission further includes a plate having at least two cams, the cams being movable in respective cam slots in the jaws and engageable with radially inner and outer sides of the respective cam slots for moving the at least two jaws between the first and second positions.

In another embodiment, the transmission further includes a plurality of mounting bolts coupled to the motor to mount the jaws and the plate to the motor, the at least one mounting bolt guiding movement of the plate and the jaws.

In yet another embodiment, each jaw includes at least one slot for receiving one of the mounting bolts, the jaws being movable relative to the mounting bolts such that each mounting bolt is in a first position in the respective slot when the jaws are in their respective first positions and in a second position in the respective slot when the jaws are in their respective second positions.

In still another embodiment, each jaw includes a plurality of radially inwardly protruding teeth for engaging teeth on the hub portion.

In a further embodiment, the at least two jaws are radially spaced apart by first and second rods at opposite ends of the jaws.

According to another aspect of the invention, a brake assembly is provided that includes a hub for driving a wheel, the hub including a hole for receiving an output shaft of a motor, a hub portion, and a flange portion extending radially outwardly from an outer axial end of the hub portion, the hub portion having axially inwardly from the flange portion, a plurality of radially outwardly protruding teeth circumferentially spaced around the hub portion, a rotation plate having at least one cam, and at least one jaw having at least one tooth and at least one cam slot in which the cam is received for moving the at least one jaw between first and second positions, wherein the at least one jaw is movable between the first position where the at least one tooth is disengaged from teeth on the hub portion and the second position where the at least one tooth engages teeth on the hub portion to prevent rotation of the hub.

In an embodiment, the brake assembly further includes at least two jaws each having at least one tooth and at least one cam slot, wherein the rotation plate includes at least two cams, each cam being movable in a respective one of the cam slots and engageable with radially inner and outer sides of the respective cam slot for moving the jaws between the first and second positions.

In another embodiment, the at least two cams are configured to move past a central line of action of the at least two jaws for locking the brake.

According to still another aspect of the invention, a brake assembly is provided that includes a hub for driving a wheel, the hub including a hole for receiving an output shaft of a motor, a hub portion having a plurality of radially outwardly protruding teeth circumferentially spaced around the hub portion, and a flange portion extending radially outwardly from an outer axial end of the hub portion, and first and second jaws each having a plurality of radially inwardly protruding teeth, wherein the first and second jaws are movable between a first position where the teeth on the jaws are disengaged from the teeth on the hub and a second position where the teeth on the jaws engage the teeth on the hub to prevent rotation of the hub.

In an embodiment, the brake assembly further includes an actuator assembly configured to move the first and second jaws between the first and second positions.

The foregoing and other features of the invention are hereinafter described in greater detail with reference to the accompanying drawings.

BRIEF DESCRIPTION OF THE DRAWINGS

FIG. 11 is a front view of the jaw assembly and actuator assembly in a first position.

FIG. 12 is a front view of the jaw assembly and actuator assembly in a second position.

DETAILED DESCRIPTION

The principles of the present application have particular application to mowers, such as zero-turn-radius mowers, and thus will be described below chiefly in this context. It will of course be appreciated and also understood that the principles of the invention may be useful in other vehicles, such as vehicles utilizing mechanical, hydrostatic, hydraulic, or electric drive systems.

Figure 1:
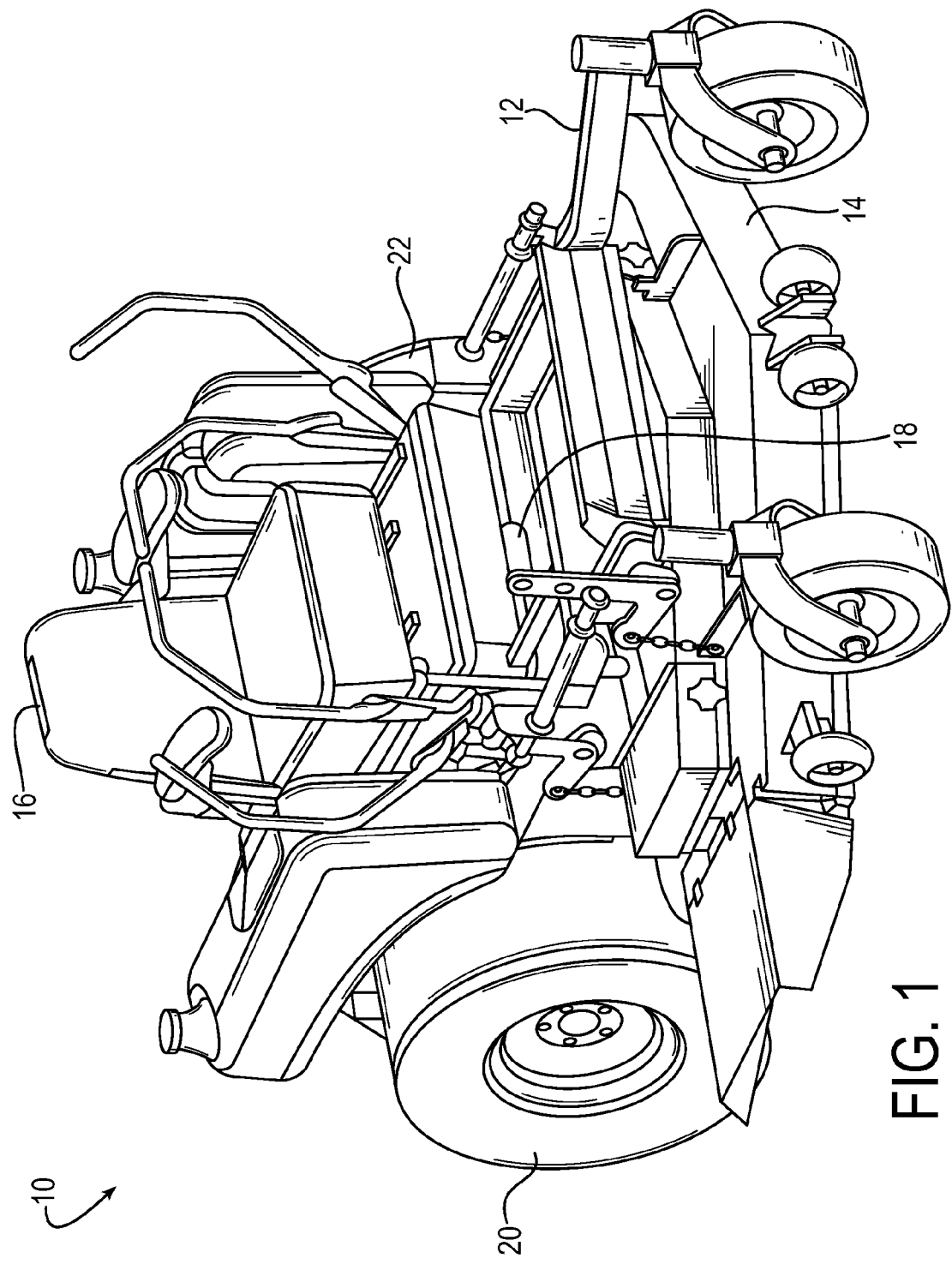
FIG. 1 is a perspective view of an exemplary zero-turn-radius mower.

Referring now to the drawings in detail, and initially to FIG. 1, an exemplary zero-turn-radius mower 10 is illustrated. The mower 10 includes a frame 12, a mower deck 14 supported by the frame 12 for mowing grass, an operator seat 16, and a plurality of controls 18 for operating the mower 10. A rear mounted engine (not shown) mounted to the frame 12 behind the seat 16 provides power to a hydraulic axle combination mounted to the frame 12, the hydraulic axle combination including hydrostatic transmissions, such as a left-hand hydrostatic transmission 30 (FIG. 2) and a right-hand hydrostatic transmission (not shown). The hydrostatic transmissions can be controlled by an operator to independently drive respective rear wheels 20 to propel the mower and provide zero-turn-radius functionality. The design of the illustrated mower 10 is merely exemplary in nature, and it will be appreciated that other mower designs and vehicle types can be used in accordance with the invention.

Figure 2:
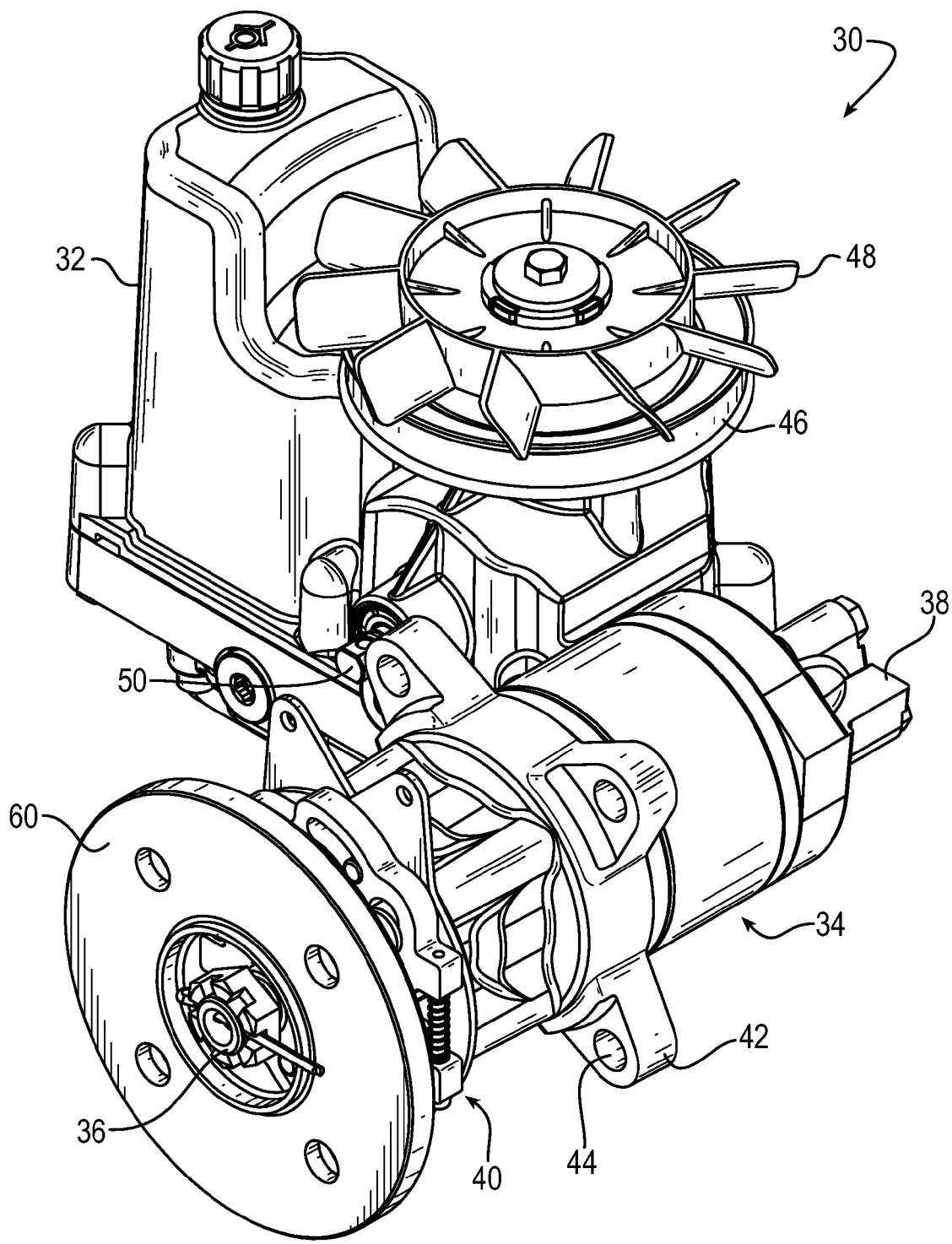
FIG. 2 is a front perspective view of a hydrostatic transmission including an exemplary brake assembly according to the invention.
Figure 3:
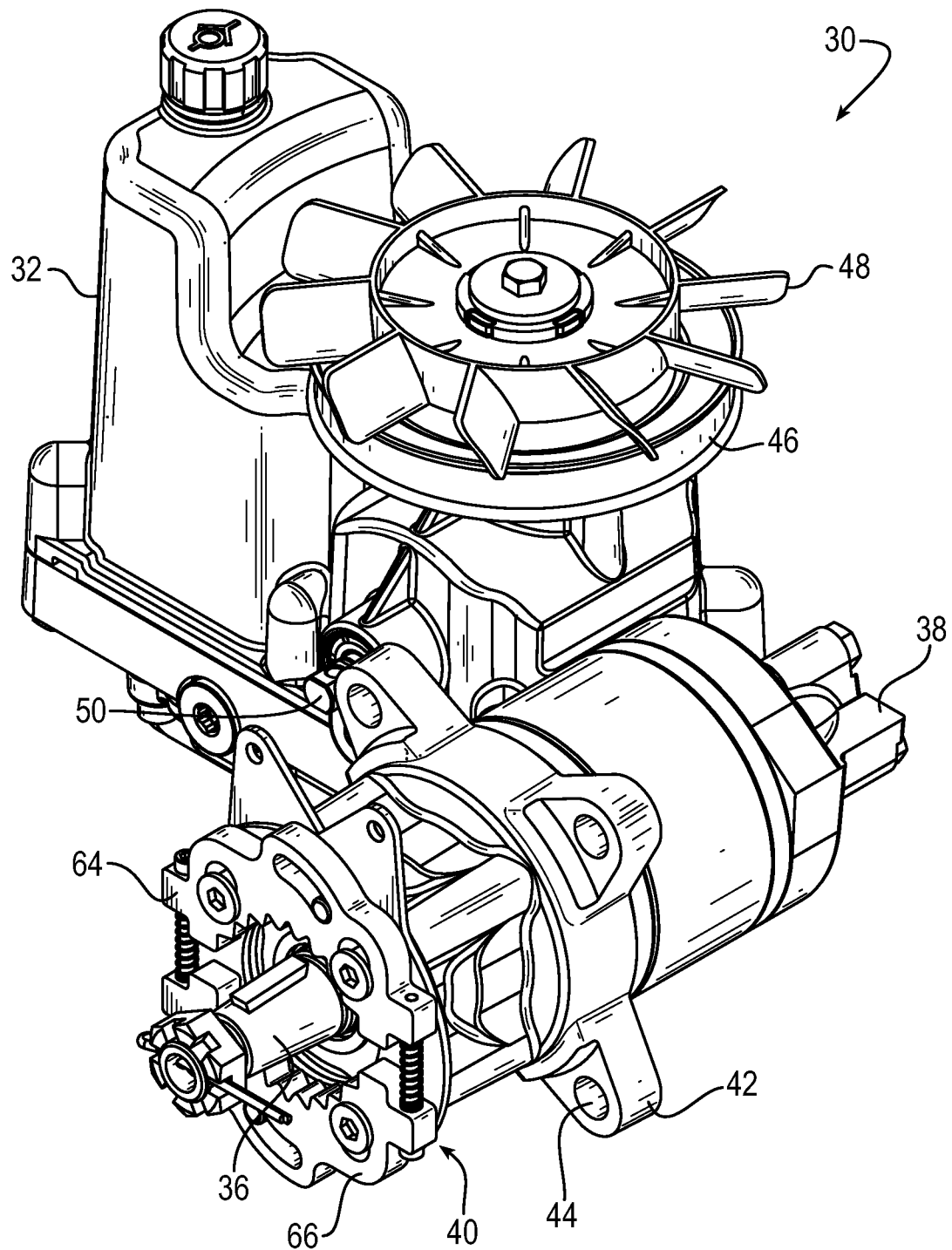
FIG. 3 is another front perspective view of the hydrostatic transmission including the exemplary brake assembly according to the invention.
Figure 4:
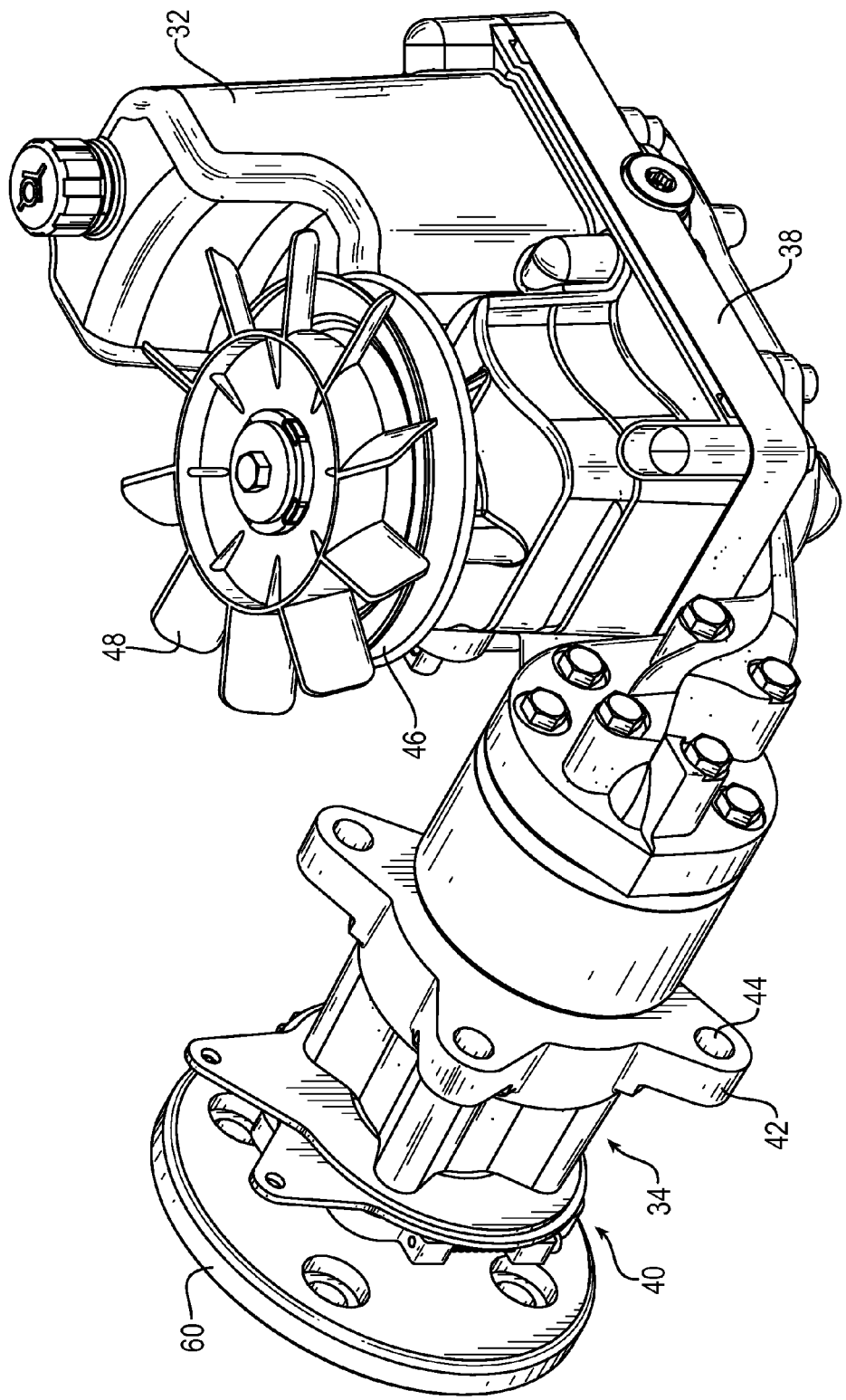
FIG. 4 is a rear perspective view of the hydrostatic transmission including the exemplary brake assembly according to the invention.

Turning now to FIGS. 2-4, the transmission 30 includes a reservoir housing 32 that houses a hydraulic pump, a hydraulic motor 34 that includes an output shaft 36 that can act as an axle shaft or be coupled to an axle shaft, a porting manifold 38 including a pump mount surface and a motor mount surface, and a brake assembly 40 coupled to the motor 34 to prevent rotation of the wheel 20 as described below. The motor 34, which may be any suitable motor such as a low speed, high torque hydraulic motor, is provided with attachment lugs 42 having through holes 44 for receiving fasteners for mounting the motor 34, and more particularly the entire transmission 30, to the mower 10. The hydraulic pump, which may be any suitable pump such as a variable displacement piston pump, has an input shaft projecting from the reservoir housing 32 to which an input wheel 46 and a cooling fan 48 may be attached, and a trunnion shaft 50 extending through the housing 32. The input wheel 46, as shown, may be a pulley about which a drive belt can be trained as is customary for driving a pump off of an engine. Alternatively, other types of drive wheels may be employed, such as a sprocket for use with a chain drive. It is noted, however, that pulley drives are more customary in the zero-turn-radius art.

Figure 6:
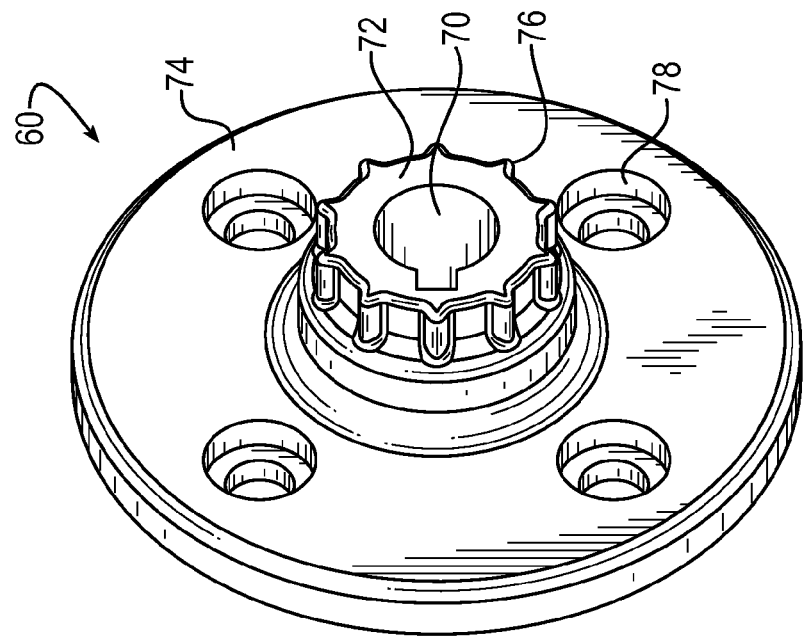
FIG. 6 is a perspective view of a hub of the brake assembly.
Figure 5:
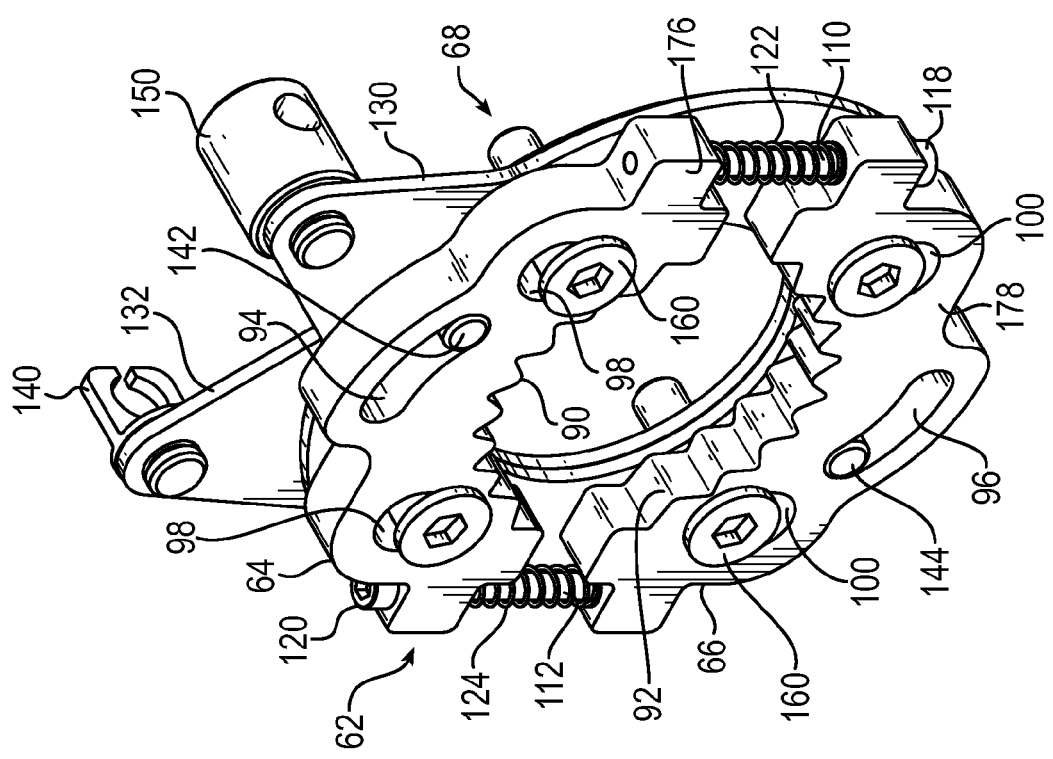
FIG. 5 is a perspective view of a jaw assembly and actuator assembly of the brake assembly.
Figure 8:
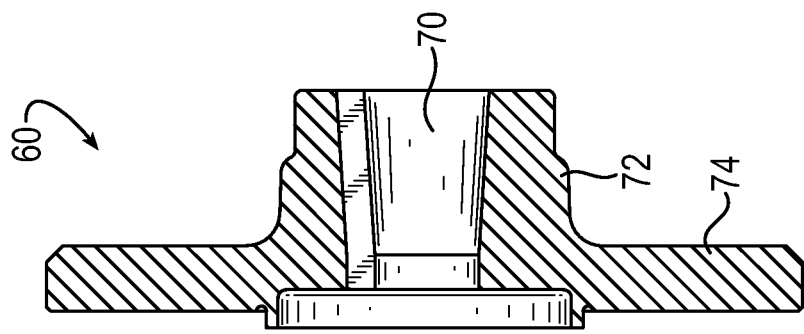
FIG. 8 is a cross-sectional view of the hub taken about line A-A in FIG. 7.
Figure 7:
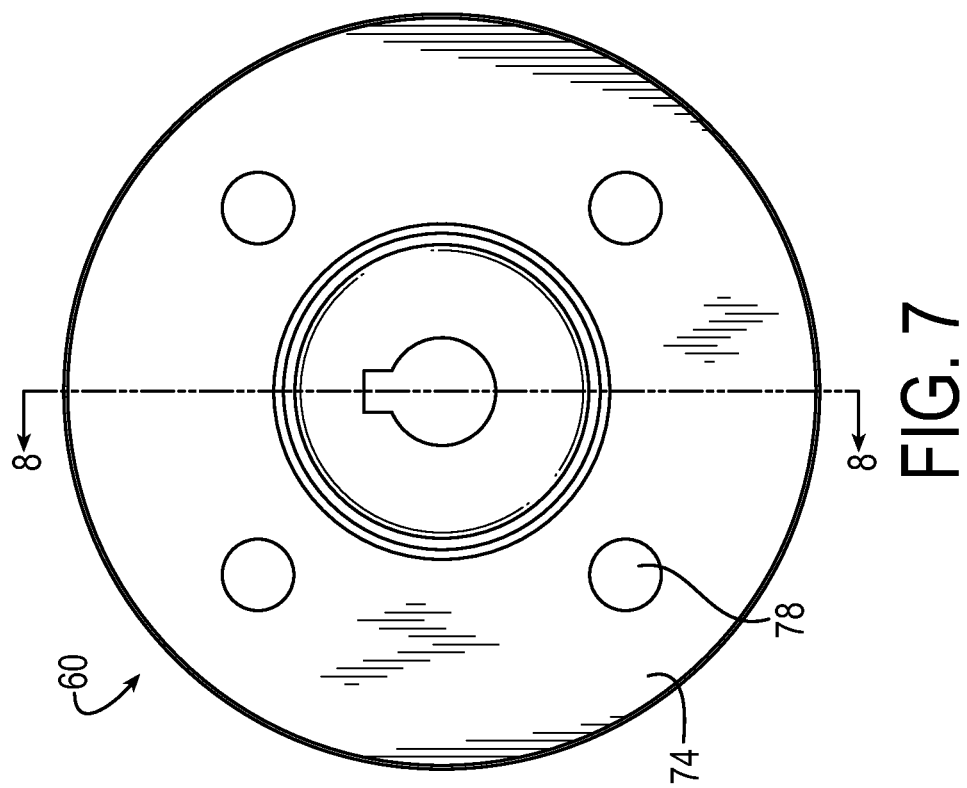
FIG. 7 is a rear view of the hub.
Figure 10:
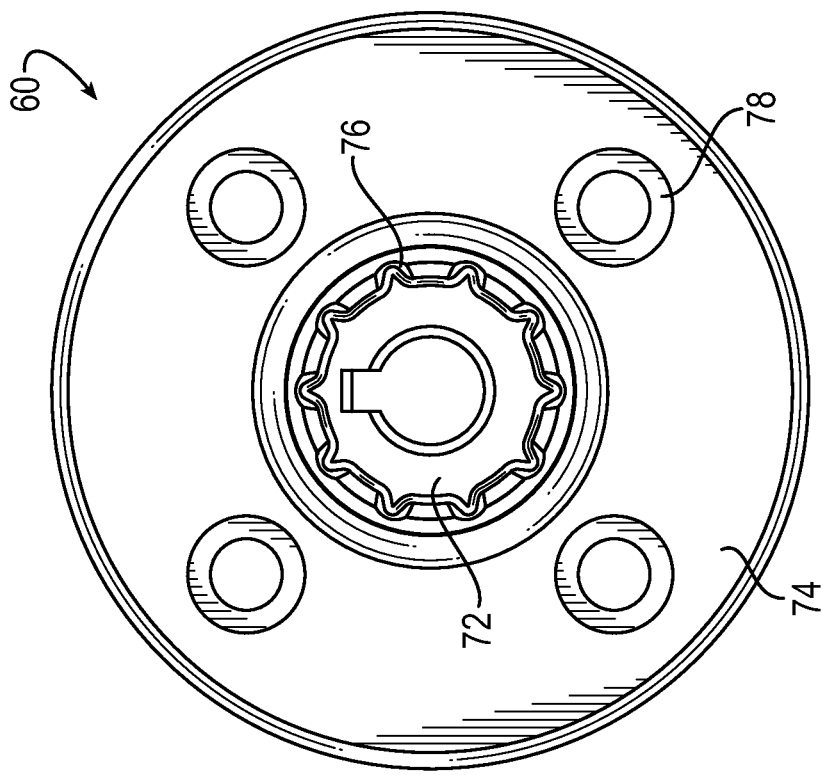
FIG. 10 is a front view of the hub.
Figure 9:
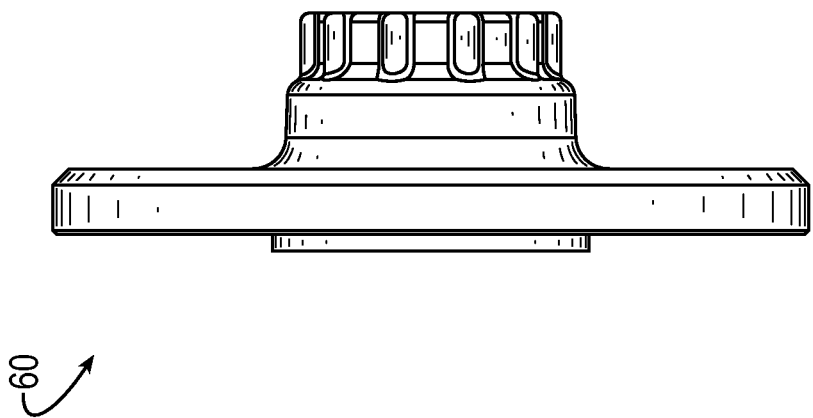
FIG. 9 is a side view of the hub.
Figure 13:
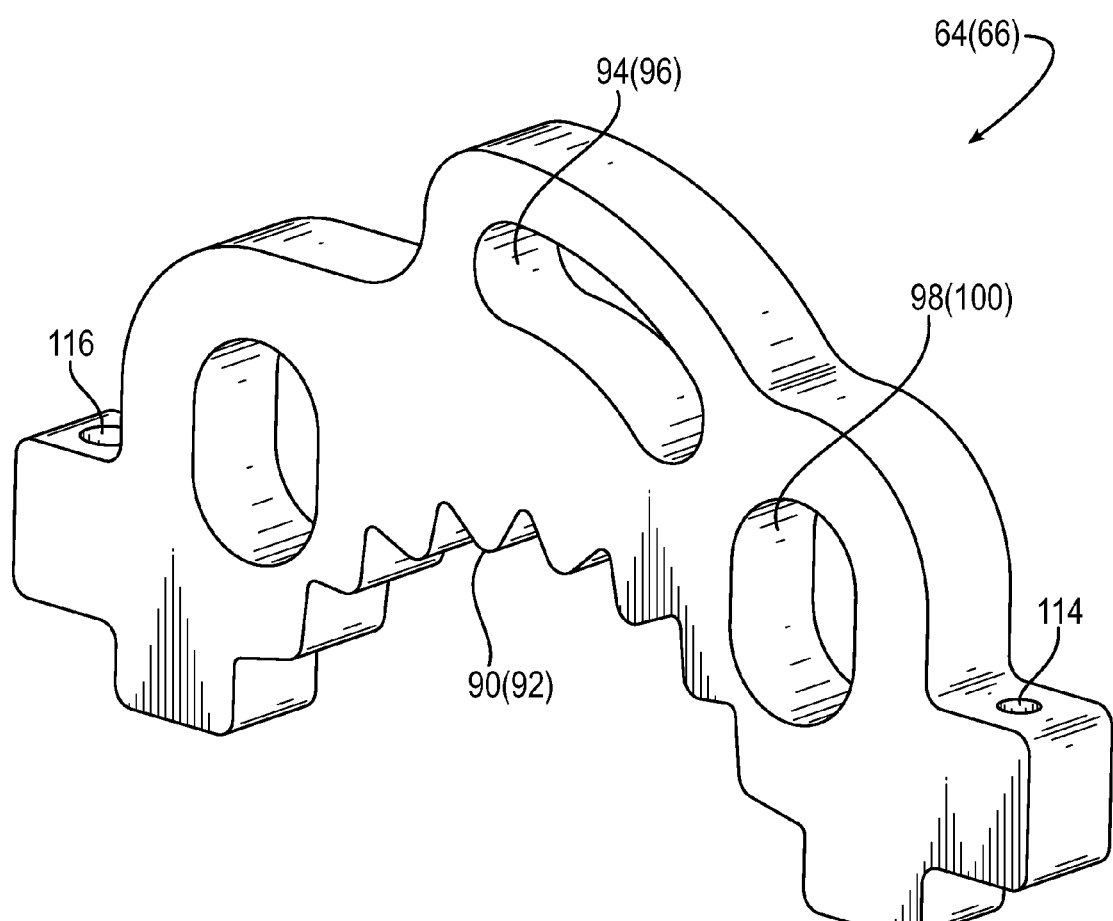
FIG. 13 is a perspective view of an exemplary jaw.

Turning now to FIGS. 5-15, and initially to FIGS. 5 and 6, the exemplary brake assembly 40 will be discussed in detail. The brake assembly 40 may include a hub 60 for mounting the wheel 20, a jaw assembly 62 including at least one jaw and in the illustrated embodiment first and second jaws 64 and 66, and an actuator assembly 68. The hub 60 is coupled to the output shaft 36 such that the hub 60 rotates with the output shaft 36. For example, the hub includes a hole 70, such as a keyed hole for receiving the output shaft 36. The components of the brake assembly 40 may be used for both left-side and right-side brakes.

As shown in FIGS. 6-10, the hub 60 also includes a hub portion 72, and a flange portion 74 extending radially outwardly from an outer axial end of the hub portion 72. The hub portion has, axially inwardly from the flange portion 74, a plurality of radially outwardly protruding teeth 76 circumferentially spaced around the hub portion, and the flange portion 74 has a plurality of holes 78 for receiving wheel lugs for mounting the wheel. The teeth 76 may be integral with the hub portion 72 or coupled to the hub portion in any suitable manner. Alternatively, the teeth may be provided on the output shaft, on heads of wheel studs, or projections from the wheel studs.

As shown in FIGS. 5 and 11-13, the first and second jaws 64 and 66 each include at least one tooth 90, 92 respectively, cam slots 94 and 96 respectively, and mounting openings 98 and 100 respectively. In the illustrated embodiment, the jaws 64 and 66 include a plurality of teeth 90 and 92 projecting radially inwardly from the jaws perpendicular to the axis of the output shaft 36. The teeth 90 and 92 may be integral with the jaws 64 and 66 or coupled to the jaws in any suitable manner, and may have any suitable angle, for example to maximize holding torque while permitting a smooth release. The tooth angles may be, for example, five degrees less than the tooth angles on the hub portion 72. The mating surfaces of cam slots 94 and 96 may be designed to provide substantially constant actuation force and may be covered with shoes or coated to improve interaction with the actuation assembly 68. The jaws may be made in any suitable manner, such as blanking or stamping.

The jaws 64 and 66 are positioned such that the teeth 90 oppose the teeth 92. The jaws are movable from a first position or disengaged position shown in FIG. 11 where the teeth 90 and 92 are disengaged from the teeth 76 on the hub portion 72 to a second position or engaged position shown in FIG. 12 where the teeth 90 and 92 engage the teeth 76 on the hub portion to stop rotation of the output shaft 36 by interference rather than friction. When the jaws are moved from the first position to the second position, the jaws 64 and 66 are moved radially towards one another in a direction substantially perpendicular to the axis of the output shaft 36.

The jaw assembly 62 also includes first and second rods 110 and 112 at opposite ends of the jaws 64 and 66 to radially space the jaws. The rods 110 and 112 may be received in openings 114 and 116 in each jaw 64 and 66, shown in FIG. 13, to guide the jaws in a direction perpendicular to the output shaft 36. A first end of each rod 110 and 112 is coupled to one of the openings 114 respectively, and a second end of each rod 90 and 92 moves in one of the openings 116 respectively. The rods 110 and 112 each include a head 118, 120, respectively, at the second ends that serve as a stop, and the rods are surrounded by respective springs 122 and 124 that prevent component rattling, for example due to clearances. The springs may be any suitable springs, such as wave springs, coil springs, leaf springs, solid springs, etc.

Figure 15:
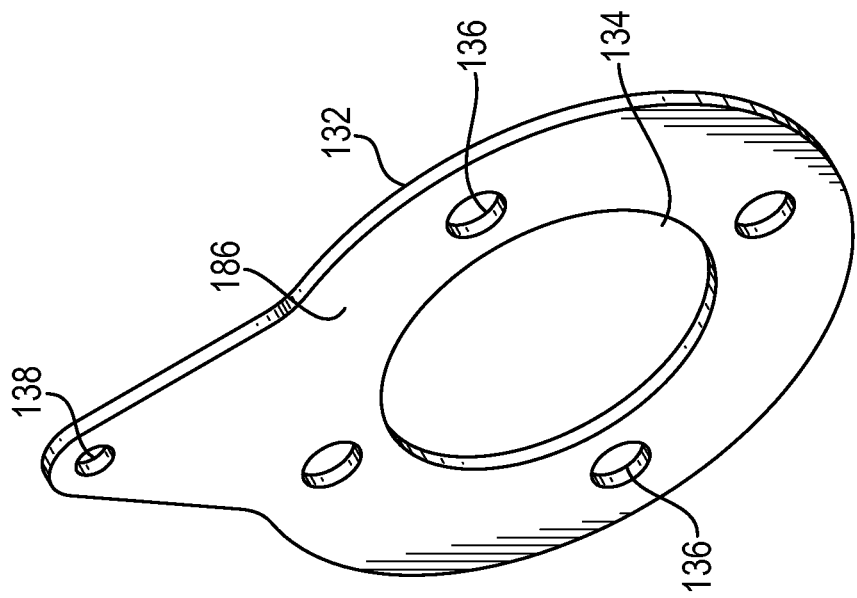
FIG. 15 is a perspective view of a stationary plate of the actuator assembly.
Figure 14:
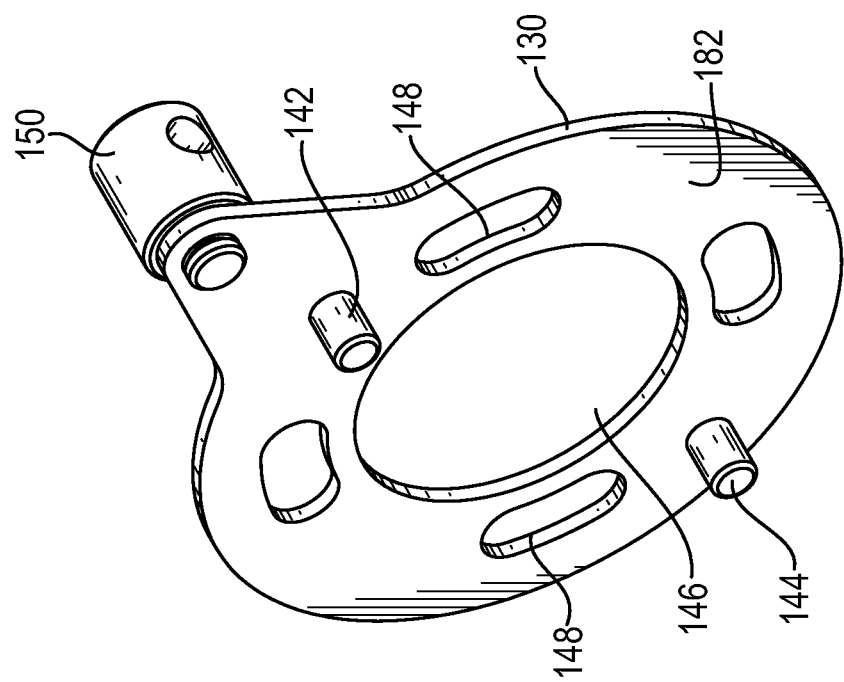
FIG. 14 is a perspective view of a rotation plate of the actuator assembly.

Referring now to FIGS. 14 and 15 in addition to FIG. 5, the actuator assembly 68 is provided to move the jaws 64 and 66 between the first and second positions. The actuator assembly 68 may include a rotation plate 130 and a stationary plate 132 defining a bearing area for the rotation plate 130. Rotation of the rotation plate 130 causes the first and second jaws 64 and 66 to move towards one another in a direction perpendicular to the axis of the output shaft 36.

The stationary plate 132 includes an opening 134 through which the output shaft 36 extends, a plurality of openings 136 circumferentially spaced around the stationary plate 132 through which mounting bolts extend, and an opening 138 for receiving a cable bracket 140. The rotation plate 130 includes first and second cams 142 and 144, an opening 146 through which the output shaft 36 extends, a plurality of openings or slots 148 circumferentially spaced around the rotation plate through which mounting bolts extend, and an opening for receiving a cable anchor 150.

The first and second cams 140 and 142 are received in the cam slots 94 and 96 respectively for moving the jaws 64 and 66 between the first and second positions. The cams 140 and 142 are movable in the respective cam slots 94 and 96 and engageable with radially inner and outer sides of the respective cam slots 94 and 96 for moving the jaws 64 and 66. In this way, rotation of the rotation plate 130 is converted into linear translation of the jaws 64 and 66. The cams 140 and 142 may be aligned or nearly aligned over a center of the jaw assembly 62 in an engaged position perpendicular to the axis of the output shaft 36 and through a center of rotation of the rotation plate, thereby locking the brake in the engaged position and limiting destroking due to positive separating forces from the teeth. Shoes, coating, etc., may be applied to the cams 140 and 142 to approve interaction with the cam slots 94 and 96.

The rotation plate 130 is movable by a cable (not shown) or rigid linkage connected at one end to an operator control and at another end to the cable anchor 150 coupled to the rotation plate 130. The cable may be guided by the cable jacket bracket 140 received in the opening 138 in the stationary plate 132. Alternatively, the rotation plate 130 may be actuated using any suitable linear motion mechanism that would provide a predetermined amount of travel and predetermined amount of force, such as an electro-mechanical mechanism, rigid mechanical mechanism (e.g., bar), hydraulic mechanism, pneumatic mechanism, etc. The actuation of the actuation assembly 68 may be spring applied and actuated to release, actuated to apply and spring released, actuated to apply and release, etc. A spring, such as a pre-compressed compression spring or an extension spring, may be provided on or near the cable that allows for extra compliance for the teeth to move into position. For example, if the teeth 90 and 92 on the jaws 64 and 66 are in tooth to tooth contact with the teeth 76 on the hub portion 72.

Figure 16:
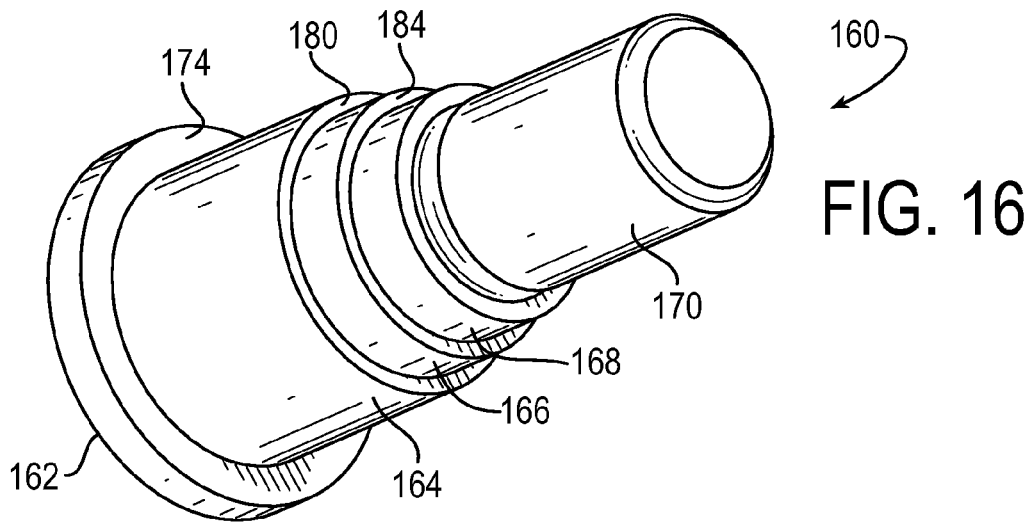
FIG. 16 is a rear perspective view of an exemplary mounting bolt.
Figure 17:
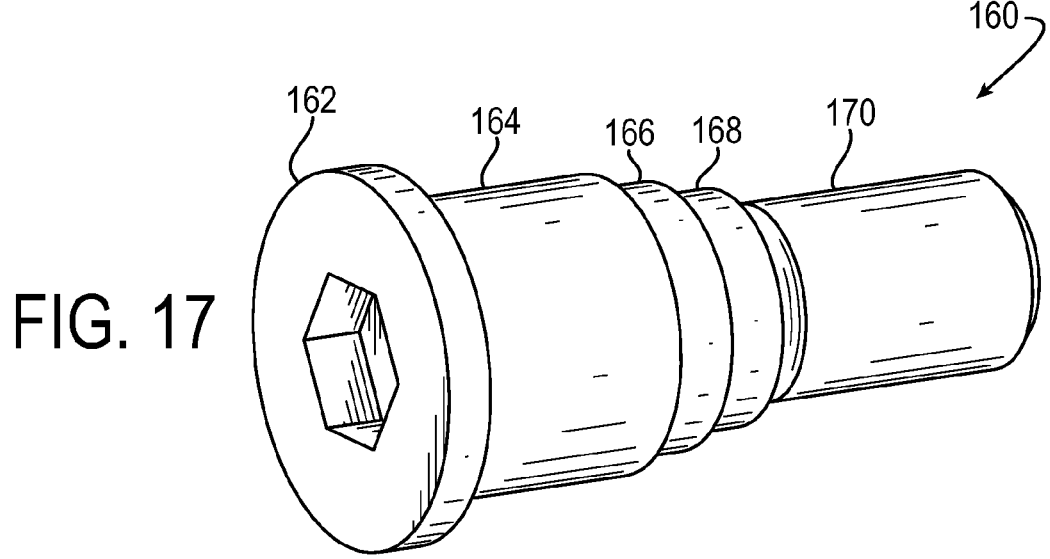
FIG. 17 is a front perspective view of the mounting bolt.
Figure 18:
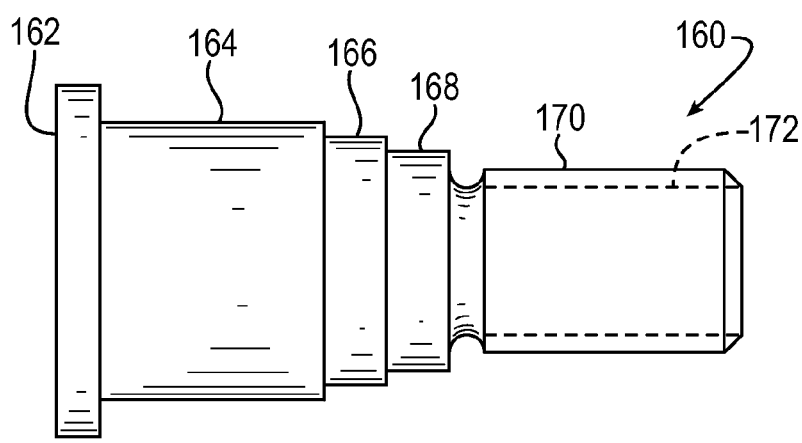
FIG. 18 is a side view of the mounting bolt.

Turning now to FIGS. 16-18, an exemplary mounting bolt is shown at reference numeral 160. A plurality of the mounting bolts 160 are provided to mount the jaw assembly 62 and actuator assembly 68 to the housing of the motor 34, for example by being threaded into bolt holes in the motor housing. The mounting bolts 160 guide movement of the jaws 64 and 66 and the rotation plate 130. The mounting bolts 160 include a head portion 162 and a plurality of stepped surfaces 164, 166 and 168 for axially retaining the jaw assembly 62 and actuator assembly 68 relative to the motor 36, and a threaded portion 170 having threads 172 for mating with threads in the motor housing. When installed, the mounting bolts 160 may be substantially parallel to the axis of the output shaft 36 to provide structural support as well as locating the actuator, stationary plate and jaws, and brake torque loads may be transmitted through the mounting bolts 160.

To axially retain the jaws 64 and 66, the mounting bolts 160 are inserted into the pair of openings or slots 98 and 100 such that a portion of the wall of the openings 98 and 100 abuts the stepped surfaces 164 and a backside 174 of the head portions 162 abuts a respective front face 176, 178 of the jaws 64 and 66. The stepped surfaces 164 of the bolts 160 have an axial thickness greater than the thickness of the jaws 64 and 66. The openings 98 and 100 are sized such that a length of the openings in a direction perpendicular to the axis of the output shaft 36 is greater than a diameter of the stepped surface 164. In this way, the jaws 64 and 66 may be moved relative to the mounting bolts 160 and the mounting bolts 160 guide the jaws 64 and 66 in the radial direction. The jaws 64 and 66 are movable relative to the mounting bolts 160 such that each mounting bolt 160 is in a first position in the respective slot 98, 100 shown in FIG. 11 when the jaws 64 and 66 are in their respective first positions and in a second position in the respective slot 98, 100 shown in FIG. 12 when the jaws are in their respective second positions.

To axially retain the rotation plate 130, the mounting bolts 160 are inserted into the plurality of openings 148 such that a portion of the wall of the openings 148 abuts the stepped surfaces 166 and a backside 180 of the stepped surface 164 abuts a front face 182 of the rotation plate 130. The stepped surfaces 166 of the bolts 160 have an axial thickness greater than the thickness of the rotation plate 130. The openings 148 are sized such that a length of the openings in the circumferential direction is greater than a diameter of the stepped surface 166. In this way, the rotation plate 130 may be moved relative to the mounting bolts 160 and the mounting bolts 160 guide the rotation plate. The rotation plate 130 is movable relative to the mounting bolts 160 such that each mounting bolt 160 is in a first position in the respective opening 148 when the rotation plate 130 is in the first position shown in FIG. 11 and in a second position in the respective opening 148 when the rotation plate 130 is in the second position shown in FIG. 12.

To axially retain the stationary plate 132, the mounting bolts 160 are inserted into the plurality of openings 136 such that the wall of the openings 136 abuts the stepped surface 168 and a backside 184 of the stepped surface 166 abuts a front face 186 of the stationary plate 130. The stepped surfaces 168 of the bolts 160 have an axial thickness greater than the thickness of the stationary plate 132. The openings 136 are sized so as to have a diameter substantially equal to the diameter of the stepped surface 166. In this way, the stepped surfaces 168 engage the openings 136 to prevent movement of the stationary plate 130.

During use of the mower 10, to prevent rotation of the wheels 20, for example when the mower is parked and not in use, the operator actuates a control thereby controlling the brake assembly 40. When the operator actuates the control, the rotation plate 130 is moved, for example by a cable attached to the cable anchor 150, from the first position shown in FIG. 11 to the second position shown in FIG. 12. As the rotation plate 130 rotates about the axis of the motor shaft 36, the rotation plate 130 is moved relative to and guided by the mounting bolts 160 attached to the motor 34. Additionally, rotation of the rotation plate 130 causes the cams 142 and 144 engaged in the cams slots 94 and 96 to move from their first position to their second position within the cam slots 94 and 96.

As the cams 142 and 144 move in the cam slots 94 and 96, the jaws 64 and 66 are moved towards one another perpendicular to the axis of the output shaft 36 from the first disengaged position to second engaged position. When in the engaged position, the teeth 90 and 92 on the jaws 64 and 66, respectively, engage with teeth 76 on the hub portion 72 to prevent rotation of the hub 60, thereby preventing rotation of the output shaft 36. As the jaws 64 and 66 are moved to the engaged position, the jaws 64 and 66 are moved relative to and guided by the mounting bolts 160, and the springs 122 and 124 are compressed as shown in FIG. 12.

To disengage the teeth 90 and 92 from the teeth 76, the rotation plate 130 is rotated back to the first position, for example by the operator actuating the control, thereby moving the jaws 64 and 66 back to their first position. Once the teeth 90 and 92 are disengaged from the teeth 76, the output shaft 36 is free to rotate, thereby allowing the wheels 20 to rotate.

The brake assembly 40 may be an external, bolt on device to replace friction brakes. The brake assembly may sustain large holding torques with low input forces due to the holding torque being independent of actuator input force. The brake assembly may use relatively small components to reduce cost, space requirements, and actuation effort for an operator. For example, the components may fit within an envelope six inches in diameter by two inches long, where a portion of one or both of the rotation and stationary plates 130 and 132 may extend outside of the envelope. The brake assembly may serve as, for example, a static brake that may perform dynamic stops, even for heavy vehicles at full speed. The brake assembly may disengage under load and can be configured for positive disengagement. The positive locking brake assembly may have a holding torque that is not proportional to input force to allow the brake to hold large loads with small input force.

The brake assembly 40 is shown installed on the housing of the motor 34, although it will be appreciated that the brake assembly may be installed on an axle housing or other suitable structures in proximity to the output shaft 36. While shown mounted around the output shaft 36, the brake assembly 40 may also be mounted around a brake shaft provided for braking, such as a brake shaft for a gear drive that is upstream of the output shaft 36, a brake shaft for a worm-gear type speed reducer, which is connected to or integral with an input shaft, a brake shaft for a straight shaft motor that is connected to or integral with the main output shaft (for example extending out the end of the motor opposite the main output shaft), etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydrostatic transmission including:
   a hydraulic pump;
   a hydraulic motor being in fluidic communication with the hydraulic pump and including an output shaft;
   a hub for mounting a wheel, the hub including a hole for receiving the output shaft of the motor, a hub portion, and a flange portion extending radially outwardly from an outer axial end of the hub portion, the hub portion having axially inwardly from the flange portion, a plurality of radially outwardly protruding teeth circumferentially spaced around the hub portion; and
   at least one jaw having at least one tooth and at least one cam slot in which a cam is received for moving the at least one jaw between first and second positions,
   wherein the at least one jaw is movable between the first position where the at least one tooth is disengaged from teeth on the hub portion and the second position where the at least one tooth engages teeth on the hub portion to prevent rotation of the hub.

2. The hydrostatic transmission according to claim 1, further including a rotation plate having the cam, the cam being movable in the at least one cam slot and engageable with radially inner and outer sides of the cam slot for moving the at least one jaw between the first and second positions.

3. The hydrostatic transmission according to claim 2, further including a stationary plate defining a bearing area for the rotation plate.

4. The hydrostatic transmission according to claim 3, wherein the rotation plate and the stationary plate each include an opening through which the output shaft extends.

5. The hydrostatic transmission according to claim 3, further including at least one mounting bolt coupled to the motor to mount the at least one jaw, the rotation plate, and the stationary plate to the motor, the at least one mounting bolt guiding movement of the rotation plate and at least one jaw.

6. The hydrostatic transmission according to claim 5, wherein the at least one mounting bolt has a plurality of stepped surfaces, wherein one of the plurality of stepped surfaces axially retains the at least one jaw, one of the plurality of stepped surfaces axially retains the rotation plate, and one of the plurality of stepped surfaces axially retains the stationary plate.

7. The hydrostatic transmission according to claim 6, wherein the at least one stepped surface that axially retains the stationary plate engages an opening in the stationary plate to prevent movement of the stationary plate.

8. The hydrostatic transmission according to claim 1, wherein the at least one jaw includes a plurality of radially inwardly protruding teeth for engaging teeth on the hub portion.

9. The hydrostatic transmission according to claim 1, wherein the at least one jaw includes at least two jaws each having at least one radially inwardly projecting tooth, wherein the at least two jaws are movable relative to one another between the first and second positions.

10. The hydrostatic transmission according to claim 9, further including a plate having at least two cams, the cams being movable in respective cam slots in the jaws and engageable with radially inner and outer sides of the respective cam slots for moving the at least two jaws between the first and second positions.

11. The hydrostatic transmission according to claim 9, further including a plurality of mounting bolts coupled to the motor to mount the jaws and the plate to the motor, the at least one mounting bolt guiding movement of the plate and the jaws.

12. The hydrostatic transmission according to claim 11, wherein each jaw includes at least one slot for receiving one of the mounting bolts, the jaws being movable relative to the mounting bolts such that each mounting bolt is in a first position in the respective slot when the jaws are in their respective first positions and in a second position in the respective slot when the jaws are in their respective second positions.

13. The hydrostatic transmission according to claim 9, wherein each jaw includes a plurality of radially inwardly protruding teeth for engaging teeth on the hub portion.

14. The hydrostatic transmission according to claim 9, wherein the at least two jaws are radially spaced apart by first and second rods at opposite ends of the jaws.

15. A mower including:
a frame;
a mower deck supported by the frame;
a hydraulic axle combination coupled to the frame, the hydraulic axle combination including a pair of hydrostatic transmissions according to claim 1.

16. A brake assembly including:
a hub for driving a wheel, the hub including a hole for receiving an output shaft of a motor, a hub portion, and a flange portion extending radially outwardly from an outer axial end of the hub portion, the hub portion having axially inwardly from the flange portion, a plurality of radially outwardly protruding teeth circumferentially spaced around the hub portion;
a rotation plate having at least one cam; and
at least one jaw having at least one tooth and at least one cam slot in which the cam is received for moving the at least one jaw between first and second positions,
wherein the at least one jaw is movable between the first position where the at least one tooth is disengaged from teeth on the hub portion and the second position where the at least one tooth engages teeth on the hub portion to prevent rotation of the hub.

17. The brake assembly according to claim 16, further including at least two jaws each having at least one tooth and at least one cam slot, wherein the rotation plate includes at least two cams, each cam being movable in a respective one of the cam slots and engageable with radially inner and outer sides of the respective cam slot for moving the jaws between the first and second positions.

18. The brake assembly according to claim 17, wherein the at least two cams are configured to move past a central line of action of the at least two jaws for locking the brake.

19. A brake assembly including:
a hub for driving a wheel, the hub including a hole for receiving an output shaft of a motor, a hub portion having a plurality of radially outwardly protruding teeth circumferentially spaced around the hub portion, and a flange portion extending radially outwardly from an outer axial end of the hub portion; and
first and second jaws each having a plurality of radially inwardly protruding teeth,
wherein the first and second jaws are movable between a first position where the teeth on the jaws are disengaged from the teeth on the hub and a second position where the teeth on the jaws engage the teeth on the hub to prevent rotation of the hub.

20. The brake assembly according to claim 19, further including an actuator assembly configured to move the first and second jaws between the first and second positions.

* * * * *